(12) United States Patent
Yesudas et al.

(10) Patent No.: US 11,715,052 B2
(45) Date of Patent: Aug. 1, 2023

(54) MONITORING AND ADAPTING A PROCESS PERFORMED ACROSS PLURAL SYSTEMS ASSOCIATED WITH A SUPPLY CHAIN

(71) Applicant: International Business Machines Corporation, Armonk, NY (US)

(72) Inventors: Michael Yesudas, Plano, TX (US); Raghuveer Prasad Nagar, Rajasthan (IN); Jagadesh Ramaswamy Hulugundi, Karnataka (IN); Nithin Mathew, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 17/241,319

(22) Filed: Apr. 27, 2021

(65) Prior Publication Data

US 2022/0343244 A1    Oct. 27, 2022

(51) Int. Cl.
*G06Q 10/0631* (2023.01)
*G06N 5/04* (2023.01)
*G06N 20/00* (2019.01)

(52) U.S. Cl.
CPC ......... *G06Q 10/06315* (2013.01); *G06N 5/04* (2013.01); *G06N 20/00* (2019.01)

(58) Field of Classification Search
CPC ..... G06Q 10/06315; G06N 5/04; G06N 20/00
See application file for complete search history.

(56) References Cited

U.S. PATENT DOCUMENTS

| | | | |
|---|---|---|---|
| 7,398,232 B2 | 7/2008 | Renz et al. | |
| 7,644,863 B2 | 1/2010 | Chen et al. | |
| 10,146,214 B2 | 12/2018 | Linton et al. | |
| 10,445,696 B2 | 10/2019 | Nossam | |
| 11,093,884 B2* | 8/2021 | Devarakonda | G06F 3/04883 |
| 11,282,022 B2* | 3/2022 | Devarakonda | G06Q 50/04 |
| 11,461,731 B1* | 10/2022 | Stauber | G06Q 10/0833 |
| 11,507,820 B1* | 11/2022 | Varrichio | G06N 3/08 |
| 11,545,248 B1* | 1/2023 | Nambirajan | G06N 20/00 |
| 2009/0037240 A1 | 2/2009 | Schmidt et al. | |
| 2014/0058775 A1 | 2/2014 | Siig et al. | |

(Continued)

FOREIGN PATENT DOCUMENTS

DE    102004022485 A1    3/2005

*Primary Examiner* — Dylan C White
(74) *Attorney, Agent, or Firm* — Edell, Shapiro & Finnan, LLC

(57) ABSTRACT

An embodiment of the present invention monitors a process across a plurality of systems associated with a supply chain. A context is determined for an order, where at least one of the features of the context includes information from a networked sensing device. One or more first machine learning models identify a plurality of orders of an order history having features corresponding to the order. A second machine learning model is trained with the identified plurality of orders to predict the monitoring interval for the order. The second machine learning model predicts the monitoring interval for the order based on the context of the order. The monitoring interval for the order is dynamically adjusted based on the predicted monitoring interval, and the order is monitored through an order fulfillment process across the plurality of systems associated with the supply chain in accordance with the adjusted monitoring interval.

20 Claims, 9 Drawing Sheets

(56) References Cited

U.S. PATENT DOCUMENTS

| | | |
|---|---|---|
| 2016/0217406 A1 | 7/2016 | Najmi |
| 2018/0082183 A1* | 3/2018 | Hertz ................. G06Q 30/0201 |
| 2020/0118071 A1* | 4/2020 | Venkatesan ............ G06N 20/00 |
| 2020/0210922 A1* | 7/2020 | Devarakonda ..... G06Q 10/0635 |
| 2021/0335470 A1* | 10/2021 | Nambirajan ............. G06N 7/01 |
| 2021/0383261 A1* | 12/2021 | Hanna .................. G06Q 10/105 |
| 2022/0129844 A1* | 4/2022 | Choudhury ...... G06Q 10/08355 |
| 2022/0391832 A1* | 12/2022 | Mohanty ................ G06N 3/084 |
| 2023/0123527 A1* | 4/2023 | Michael ............. G05B 23/0221 702/183 |

\* cited by examiner

MONITORING AND ADAPTING A PROCESS PERFORMED ACROSS PLURAL SYSTEMS ASSOCIATED WITH A SUPPLY CHAIN

BACKGROUND

1. Technical Field

Present invention embodiments relate to monitoring systems, and more specifically, to monitoring and adapting a process performed across a plurality of systems associated with a supply chain by machine learning.

2. Discussion of the Related Art

The latest status updates for orders in a supply chain are typically requested by end customers of retail or business personnel, thereby necessitating visibility of an order at any time across an enterprise. The visibility assists in determining fulfillment of confirmed orders as promised, or identifying any delays that have emerged in fulfillment cycles due to validation failures, temporary suspensions, technical issues, partner non-compliance, operational issues, etc.

However, enterprises face challenges in providing the correct order status update due to the order life cycle being managed by multiple applications at different points of time. These challenges are further complicated by a change in functional ownership or handling of order execution as the order execution flows from one information technology (IT) application to another. Further, personnel are limited to training for a specific application, and may be unable to provide accurate status updates across an enterprise for an end customer or stakeholder.

Large numbers of orders and practical exceptional scenarios prevent manually tracking of orders for delays. Although proactive monitoring is in place for individual applications, this is limited due to dependency of accurate status from upstream and downstream systems. An ecosystem of applications and inaccurate status visibility leads to loss of precious productive hours, customer dissatisfaction, higher holding costs of inventory, and increased logistics lead times and costs.

SUMMARY

According to one embodiment of the present invention, a computer system monitors a process across a plurality of systems associated with a supply chain, and comprises at least one processor. The system determines a context for an order including one or more features of the order. At least one of the features of the context includes information from a networked sensing device, while the order is associated with a monitoring interval for monitoring the order though an order fulfillment process performed by the plurality of systems associated with the supply chain. One or more first machine learning models identify a plurality of orders of an order history having features corresponding to the order. A second machine learning model is trained with the identified plurality of orders to predict the monitoring interval for the order. The second machine learning model predicts the monitoring interval for the order based on the context of the order. The monitoring interval for the order is dynamically adjusted based on the predicted monitoring interval, and the order is monitored through the order fulfillment process across the plurality of systems associated with the supply chain in accordance with the adjusted monitoring interval. Embodiments of the present invention include a method and computer program product for monitoring a process across a plurality of systems associated with a supply chain in substantially the same manner described above.

BRIEF DESCRIPTION OF THE DRAWINGS

Generally, like reference numerals in the various figures are utilized to designate like components.

DETAILED DESCRIPTION

Figure 1A:
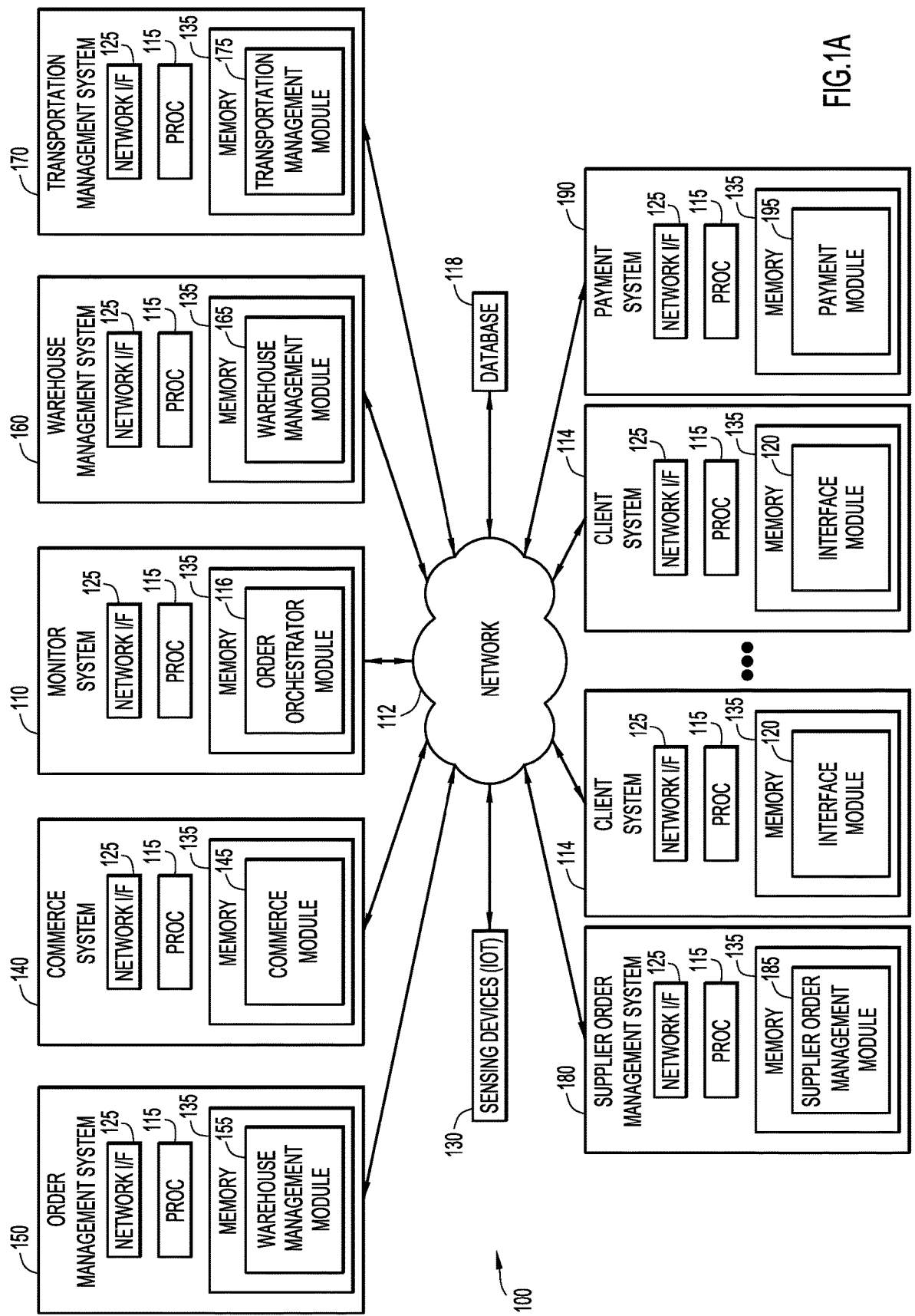
FIG. 1A is a diagrammatic illustration of an example computing environment according to an embodiment of the present invention.

Present invention embodiments employ artificial intelligence (AI) (e.g., machine learning, etc.) and networked sensing devices (e.g., Internet of Things (IoT) devices, etc.) to monitor and adapt a process (e.g., an order fulfillment process, etc.) performed across a plurality of systems (e.g., of a supply chain, etc.) for compliance with prescribed requirements.

For example, an embodiment of the present invention proactively monitors a customer order through plural systems across a seller enterprise and a supply chain. The plural enterprise systems and supply chain participate in fulfillment of an order at different points of time through an order fulfillment process. The embodiment of the present invention predicts issues (e.g., failures or delays) in fulfillment of an order, and recommends (or automatically initiates) actions to avoid or reduce the predicted issues.

A present invention embodiment dynamically derives a monitoring interval or frequency based on various criteria, including a requested item and corresponding delivery date and/or time, a supply chain status, and external factors (e.g., weather, local events, etc.) derived from networked sensing devices (e.g., Internet of Things (IoT) devices, etc.). The dynamically derived monitoring interval is used to monitor an order fulfillment process, where the monitoring provides order status across multiple systems/applications of a supply chain. The derivation of dynamic frequency intervals is contextually recommended for an item, and based on supply chain buyer/seller demographics (e.g., compliance, etc.) and external influences on the supply chain.

A present invention embodiment dynamically determines and ranks recommended actions for systems involved in order fulfillment for upcoming stages in the order fulfillment process. A present invention embodiment provides service discovery mechanisms across multiple information technology (IT) and business applications. The services are prioritized and ranked for proactive monitoring enforced in co-relation to the determined contextual dynamic frequency intervals.

A present invention embodiment proactively monitors orders that may potentially fail to satisfy a promised delivery date and/or time (or Service Level Agreement (SLA)) based on predicted issues, such as: internal and external events (e.g., weather and local disruptions) derived from networked sensing devices (e.g., Internet of Things (IoT) devices, etc.); validation failures; item stock count inaccuracies; reviews and audits; technical issues (e.g., a system down due to maintenance); partner non-compliance; and operational issues. A present invention embodiment considers an array of external and internal factors for proactive monitoring based on predicted missed promised dates or missed service level agreements (SLA).

A present invention embodiment derives a next best action plan for orders predicted to fail to satisfy delivery or due dates, including recommendations for a task/action, task assignee, and task deadline, where the derived action plan provides best assurances for satisfying the due date or Service Level Agreement (SLA). A present invention embodiment generates an action plan to meet the original planned promised date and service level agreement (SLA) as derived from proactive monitoring. A present invention embodiment notifies appropriate personnel or task assignees in advance about the predictions and recommendations to resolve the predicted situation. This provides proactive notification to personnel to work on the recommended next action plan.

A present invention embodiment escalates measures to resolve the predicted situation based on a context and criticality of business impact in response to the action plan not being followed (even when the predicted situation remains the same or worsens). Escalation management is provided as a result of continuous monitoring to determine a state of a situation as status-quo or degradation for resolution action.

An example computing environment for use with present invention embodiments is illustrated in FIG. 1A. Specifically, computing environment 100 includes a monitor or server system 110, one or more client or end-user systems 114, one or more networked sensing devices 130 (e.g., Internet of Things (IoT) devices, etc.), and one or more additional server systems (e.g., server systems 140, 150, 160, 170, 180, and/or 190). Monitor system 110 monitors and adapts a process across one or more of the additional server systems of computing environment 100 for compliance with prescribed requirements. Networked sensing devices 130 (e.g., Internet of Things (IoT) devices, etc.) measure various aspects or conditions pertaining to the process to be monitored. For example the networked sensing devices (e.g., Internet of Things (IoT) devices, etc.) may provide various data from external sources including information pertaining to weather, partner eco-systems, local disruption events (e.g., traffic, etc.), manual overrides, and information technology (IT) or other equipment failures.

The networked sensing devices (e.g., Internet of Things (IoT) devices, etc.) may be implemented by any conventional or other sensing devices (e.g., weather sensors, traffic sensors, GPS or other location sensors, equipment diagnostic or other sensors, etc.), may be disposed at any location (e.g., proximate and/or within an object), and may provide information for any desired conditions (e.g., weather and other environmental conditions, device operational status and failures, location of items and/or vehicles, etc.).

The server systems, networked sensing devices, and client systems may be remote from each other and communicate over a network 112. The network may be implemented by any number of any suitable communications media (e.g., wide area network (WAN), local area network (LAN), Internet, Intranet, etc.). Alternatively, any combination of the server systems, networked sensing devices, and client systems may be local to each other, and communicate via any appropriate local communication medium (e.g., local area network (LAN), hardwire, wireless link, Intranet, etc.).

Client systems 114 enable users to submit requests (e.g., to initiate orders, jobs, tasks and/or processes, request status, etc.) to the server systems. The client systems include an interface module 120 to enable submission of requests, and to receive and display information pertaining to the requests. The client systems may present a graphical user (e.g., GUI, etc.) or other interface (e.g., command line prompts, menu screens, etc.) to solicit information from users pertaining to desired requests (e.g., order, status, etc.), and may provide information pertaining to the requests (e.g., status, recommendations, etc.).

A database system 118 may store various information for monitoring and adapting processes. The database system may be implemented by any conventional or other database or storage unit, may be local to or remote from the server systems and client systems, and may communicate via any appropriate communication medium (e.g., local area network (LAN), wide area network (WAN), Internet, hardwire, wireless link, Intranet, etc.), such as network 112.

Client systems 114 may be implemented by any conventional or other computer systems preferably equipped with a display or monitor, a base (e.g., including at least one hardware processor 115 (e.g., microprocessor, controller, central processing unit (CPU), etc.), one or more memories 135 and/or internal or external network interfaces or communications devices 125 (e.g., modem, network cards, etc.)), optional input devices (e.g., a keyboard, mouse or other input device), and any commercially available and custom software (e.g., browser/interface module 120, etc.).

By way of example, monitor system 110 monitors and adapts an order fulfillment process performed across server systems 140, 150, 160, 170, 180, and/or 190 that are associated with, or members of, a supply chain. However, monitor system 110 may monitor and adapt other suitable processes across plural systems in substantially the same manner described below. Monitor system 110 includes an order orchestrator module 116 to monitor and adapt the order fulfillment process as described below. Monitor or server system 110 may be implemented by any conventional or other computer systems preferably equipped with a display or monitor, a base (e.g., including at least one hardware processor 115 (e.g., microprocessor, controller, central processing unit (CPU), etc.), one or more memories 135 and/or internal or external network interfaces or communications devices 125 (e.g., modem, network cards, etc.)), optional input devices (e.g., a keyboard, mouse or other input device), and any commercially available and custom software (e.g., server/communications software, order orchestrator module 116, etc.).

Server system 140 may be implemented as a commerce system and include commerce module 145 to enable electronic commerce or other actions (e.g., purchases of items from a network site, etc.) to be performed to place orders in response to requests from client systems 114. Commerce or server system 140 may be implemented by any conventional or other computer systems preferably equipped with a display or monitor, a base (e.g., including at least one hardware processor 115 (e.g., microprocessor, controller, central processing unit (CPU), etc.), one or more memories 135 and/or internal or external network interfaces or communications devices 125 (e.g., modem, network cards, etc.)), optional input devices (e.g., a keyboard, mouse or other input device), and any commercially available and custom software (e.g., server/communications software, commerce module 145, etc.).

Server system 150 may be implemented as an order management system and include order management module 155 to facilitate handling of orders placed on commerce system 140 or on the order management system. Order management or server system 150 may be implemented by any conventional or other computer systems preferably equipped with a display or monitor, a base (e.g., including at least one hardware processor 115 (e.g., microprocessor, controller, central processing unit (CPU), etc.), one or more memories 135 and/or internal or external network interfaces or communications devices 125 (e.g., modem, network cards, etc.)), optional input devices (e.g., a keyboard, mouse or other input device), and any commercially available and custom software (e.g., server/communications software, order management module 155, etc.).

Server system 160 may be implemented as a warehouse management system and include warehouse management module 165 to facilitate fulfillment of an order placed on commerce system 140 or on order management system 150 from a warehouse or other storage facility containing the items for the order. Warehouse management or server system 160 may be implemented by any conventional or other computer systems preferably equipped with a display or monitor, a base (e.g., including at least one hardware processor 115 (e.g., microprocessor, controller, central processing unit (CPU), etc.), one or more memories 135 and/or internal or external network interfaces or communications devices 125 (e.g., modem, network cards, etc.)), optional input devices (e.g., a keyboard, mouse or other input device), and any commercially available and custom software (e.g., server/communications software, warehouse management module 165, etc.).

Server system 170 may be implemented as a transportation management system and include transportation management module 175 to facilitate transportation or shipment of items for the order placed on commerce system 140 or on order management system 150 from the warehouse or storage facility to a desired destination. Transportation management or server system 170 may be implemented by any conventional or other computer systems preferably equipped with a display or monitor, a base (e.g., including at least one hardware processor 115 (e.g., microprocessor, controller, central processing unit (CPU), etc.), one or more memories 135 and/or internal or external network interfaces or communications devices 125 (e.g., modem, network cards, etc.)), optional input devices (e.g., a keyboard, mouse or other input device), and any commercially available and custom software (e.g., server/communications software, transportation management module 175, etc.).

Server system 180 may be implemented as a supplier order management system and include supplier order management module 185 to facilitate handling of orders for a supplier (e.g., placed on an order management system 150 of a seller, etc.). Supplier order management or server system 180 may be implemented by any conventional or other computer systems preferably equipped with a display or monitor, a base (e.g., including at least one hardware processor 115 (e.g., microprocessor, controller, central processing unit (CPU), etc.), one or more memories 135 and/or internal or external network interfaces or communications devices 125 (e.g., modem, network cards, etc.)), optional input devices (e.g., a keyboard, mouse or other input device), and any commercially available and custom software (e.g., server/communications software, supplier order management module 185, etc.). The supplier order management system may be in communication with other warehouse management systems and transportation management systems for fulfillment of supplier orders in a manner similar to order management system 150 described below. In addition, the supplier order management system may be implemented by any conventional or other order management systems for managing orders.

Server system 190 may be implemented as a payment system or gateway and include payment module 195 to facilitate handling of payments (e.g., electronic funds transfer, credit card transactions, etc.) for orders placed on commerce system 140 or on order management system 150. Payment or server system 190 may be implemented by any conventional or other computer systems preferably equipped with a display or monitor, a base (e.g., including at least one hardware processor 115 (e.g., microprocessor, controller, central processing unit (CPU), etc.), one or more memories 135 and/or internal or external network interfaces or communications devices 125 (e.g., modem, network cards, etc.)), optional input devices (e.g., a keyboard, mouse or other input device), and any commercially available and custom software (e.g., server/communications software, payment module 195, etc.). The payment system or gateway may be implemented by any conventional or other payment processing systems for processing payments.

The various modules (e.g., order orchestrator module 116, interface module 120, commerce module 145, order management module 155, warehouse management module 165, transportation management module 175, supplier order management module 185, payment module 195, etc.) may include one or more modules or units to perform the various functions of present invention embodiments described herein. The various modules (e.g., order orchestrator module 116, interface module 120, commerce module 145, order management module 155, warehouse management module 165, transportation management module 175, supplier order management module 185, payment module 195, etc.) may be implemented by any combination of any quantity of software and/or hardware modules or units, and may reside within memory 135 of the server and/or client systems for execution by a corresponding processor 115.

Figure 1B:
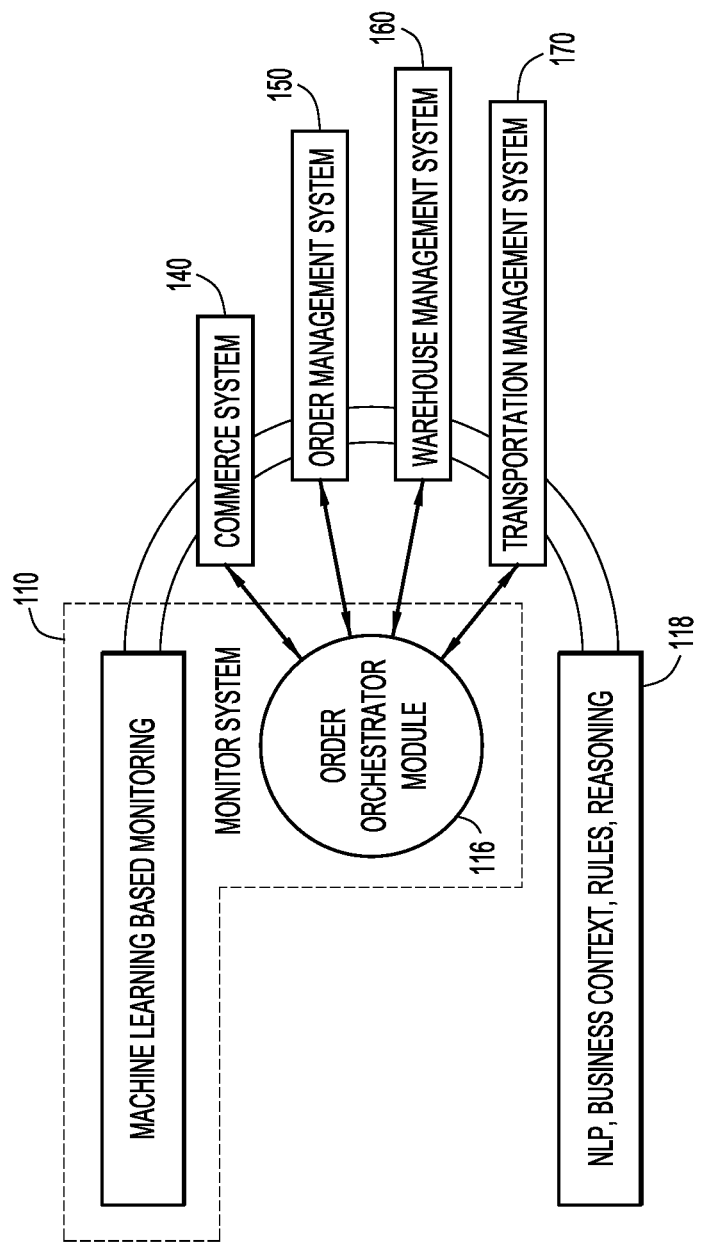
FIG. 1B is a diagrammatic illustration of an example environment for monitoring and adapting an order fulfillment process across plural systems of a supply chain according to an embodiment of the present invention.

An example environment for order fulfillment according to an embodiment of the present invention is illustrated in FIG. 1B. The environment includes monitor system 110, commerce system 140, order management system 150, warehouse management system 160, and transportation management system 170. The environment may further include networked sensing devices 130 (FIG. 1A) (e.g., Internet of Things (IoT) devices, etc.), payment system 190 (FIG. 1A) to process payments for orders, and supplier order management system 180 (FIG. 1A) to enable monitor system 110 to monitor orders for suppliers in a manner similar to that described below. An order may be initially placed by a user on commerce system 140 (e.g., purchase of items from a network site). The order may be associated with characteristics (e.g., items, shipping method, order identifier, etc.) and prescribed requirements (e.g., delivery date, etc.). Order management system 150 (e.g., via order management module 155) handles processing of the order, and may perform various functions, such as tracking sales, orders, and inventory, and connecting partners to customers. The order management system may be implemented by any conventional or other order management systems for managing orders.

Once an order is processed at order management system 150, warehouse management system 160 facilitates providing items of the order from a warehouse or other storage facility. Warehouse management system 160 (e.g., via warehouse management module 165) may perform various processes to control and administer warehouse operations for items (e.g., tracking, location, retrieval, packing, etc.) from entry until the time the items leave the warehouse or other storage facility. The warehouse management system may be implemented by any conventional or other warehouse management systems for managing warehouse operations.

After items for an order are prepared at the warehouse or other storage facility, transportation management system 170 controls transportation or shipment of the items to a desired destination of the order. Transportation management system 170 (e.g., via transportation management module 175) may perform various functions, such as planning, executing, and optimizing transportation of items, and ensuring compliance with prescribed requirements (e.g., delivery or due dates, etc.). The transportation management system may be implemented by any conventional or other transportation management systems for managing transportation or shipment of items.

Monitor system 110 (e.g., via order orchestrator module 116) monitors orders across the various systems to provide accurate status updates based on machine learning and information within database system 118 (e.g., natural language processing results on customer information, order history, context, rules, reasoning results, etc.). Monitor system 110 performs proactive monitoring of orders dynamically aligned with real-time context and situation of a supply chain by determining the correct system (or application/module) which controls a next logical step in the order fulfillment process for a current order based on current and historical information. Machine learning is employed to determine and adjust a monitoring interval or frequency.

The monitor system predicts the correct service level agreement (SLA) or delivery time based on the predicted system controlling the next step of the order fulfillment process and having visibility of an order life cycle from plural systems (or applications/modules) in an enterprise information technology (IT) landscape. The monitor system further recommends appropriate actions (e.g., alerting appropriate personnel, altering the order fulfillment process, etc.).

The monitor system further performs a contextual service discovery for various scenarios to facilitate proactive monitoring across the enterprise information technology (IT) landscape. For example, a shipment handled by the warehouse management system may be delayed, but the monitor system may determine that the service level agreement (SLA) or delivery date can be satisfied since buffer time is factored into the promised delivery date. In this case, the monitor system automatically explores and discovers another service, upgrades a shipping level from regular shipping to rush shipping, and identifies a carrier service that can accommodate the upgraded shipping level for items on the order.

The monitor system may also identify anomalies in the supply chain based on regular order flow and external events that may impact the supply chain (e.g., identified via networked sensing devices 130). The monitor system may preemptively alert a user of the potential issues.

Figure 2:
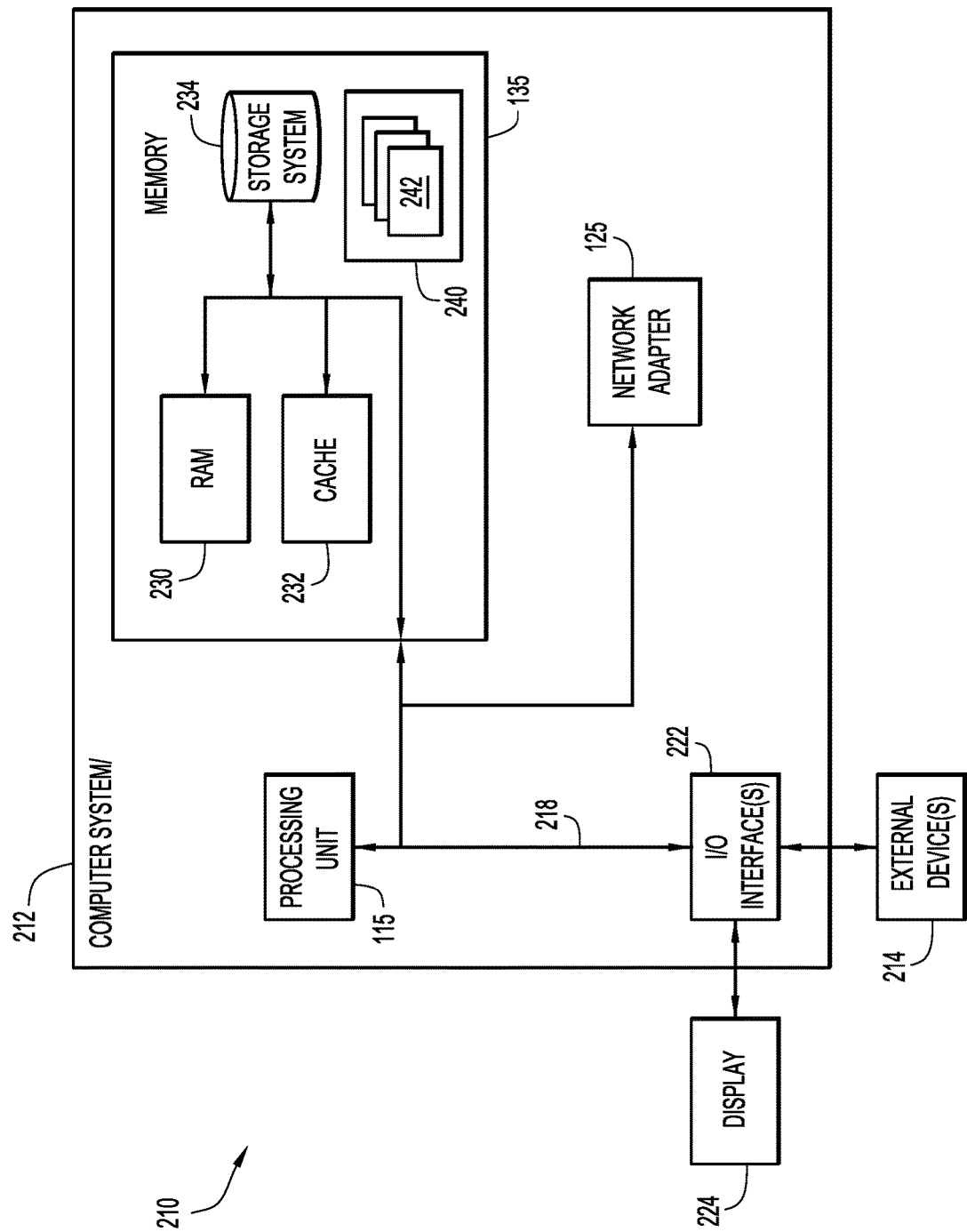
FIG. 2 is a block diagram of an example computing device according to an embodiment of the present invention.

Referring now to FIG. 2, a schematic of an example of a computing device 210 of computing environment 100 (e.g., implementing client systems 114 and server systems 110, 140, 150, 160, 170, 180, and 190) is shown. The computing device is only one example of a suitable computing device for computing environment 100 and is not intended to suggest any limitation as to the scope of use or functionality of embodiments of the invention described herein. Regardless, computing device 210 is capable of being implemented and/or performing any of the functionality set forth herein.

In computing device 210, there is a computer system 212 which is operational with numerous other general purpose or special purpose computing system environments or configurations. Examples of computing systems, environments, and/or configurations that may be suitable for use with computer system 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 2, computer system 212 is shown in the form of a computing device. The components of computer system 212 may include, but are not limited to, one or more processors or processing units 115, a system memory 135, and a bus 218 that couples various system components including system memory 135 to processor 115.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 135 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 135 may include at least one program product having a set (e.g., at least one) of program modules that are configured to carry out the functions of embodiments of the invention.

Program/utility 240, having a set (at least one) of program modules 242 (e.g., order orchestrator module 116, interface module 120, commerce module 145, order management module 155, warehouse management module 165, transportation management module 175, supplier order management module 185, payment module 195, etc.) may be stored in memory 135 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 125. As depicted, network adapter 125 communicates with the other components of computer system 212 via bus 218. It should be understood that although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

The various applications of monitor system 110 (and server systems 140, 150, 160, 170, 180, and/or 190) may be provided in a cloud environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
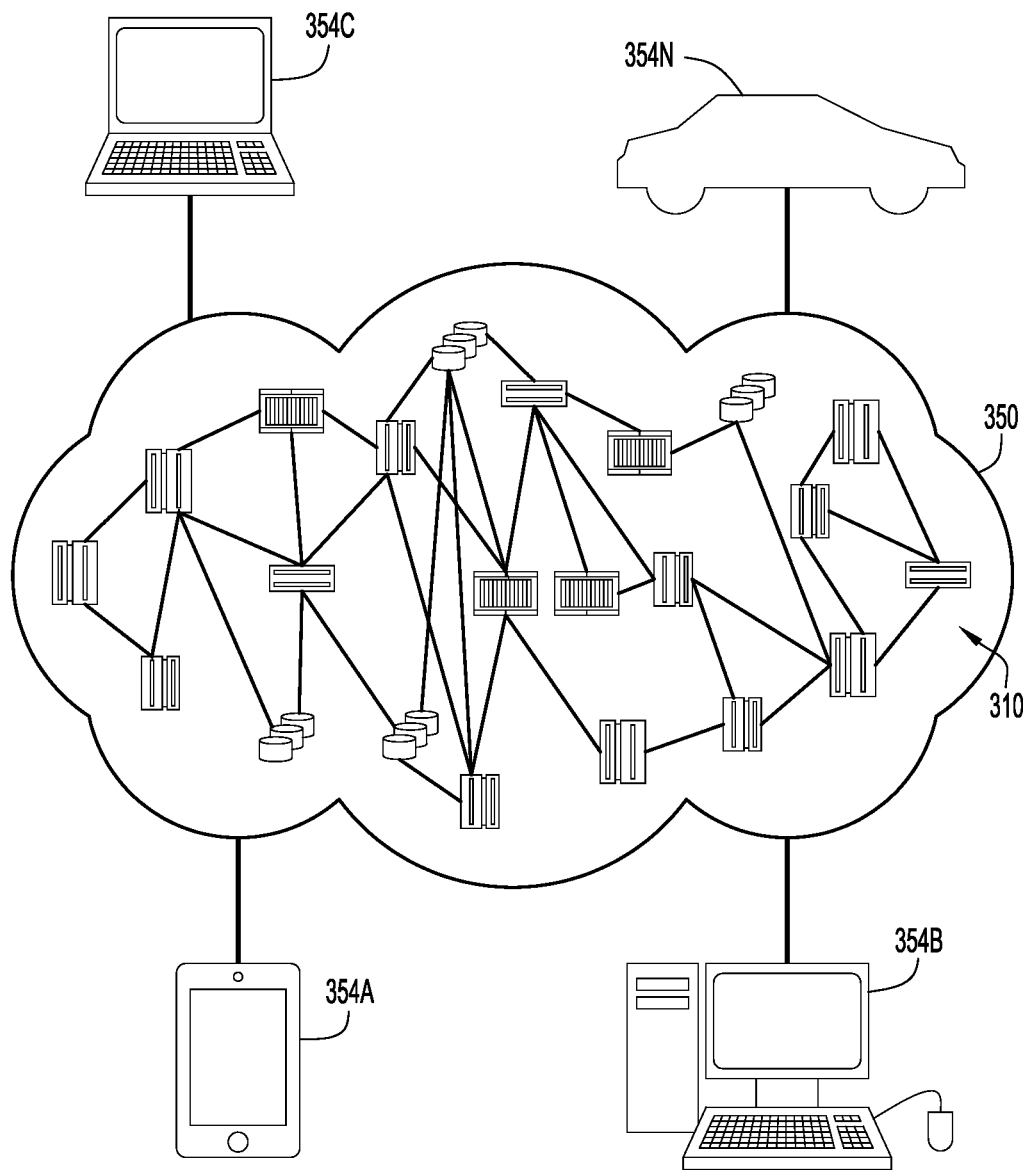
FIG. 3 is a diagrammatic illustration of an example cloud computing environment according to an embodiment of the present invention.

Referring now to FIG. 3, illustrative cloud computing environment 350 is depicted. As shown, cloud computing environment 350 includes one or more cloud computing nodes 310 with which local computing devices used by cloud consumers, such as, for example, personal digital assistant (PDA) or cellular telephone 354A, desktop computer 354B, laptop computer 354C, and/or automobile computer system 354N may communicate. Nodes 310 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-354N shown in FIG. 3 are intended to be illustrative only and that computing nodes 310 and cloud computing environment 350 can communicate with any type of computerized device over any type of network and/or network addressable connection (e.g., using a web browser).

Figure 4:
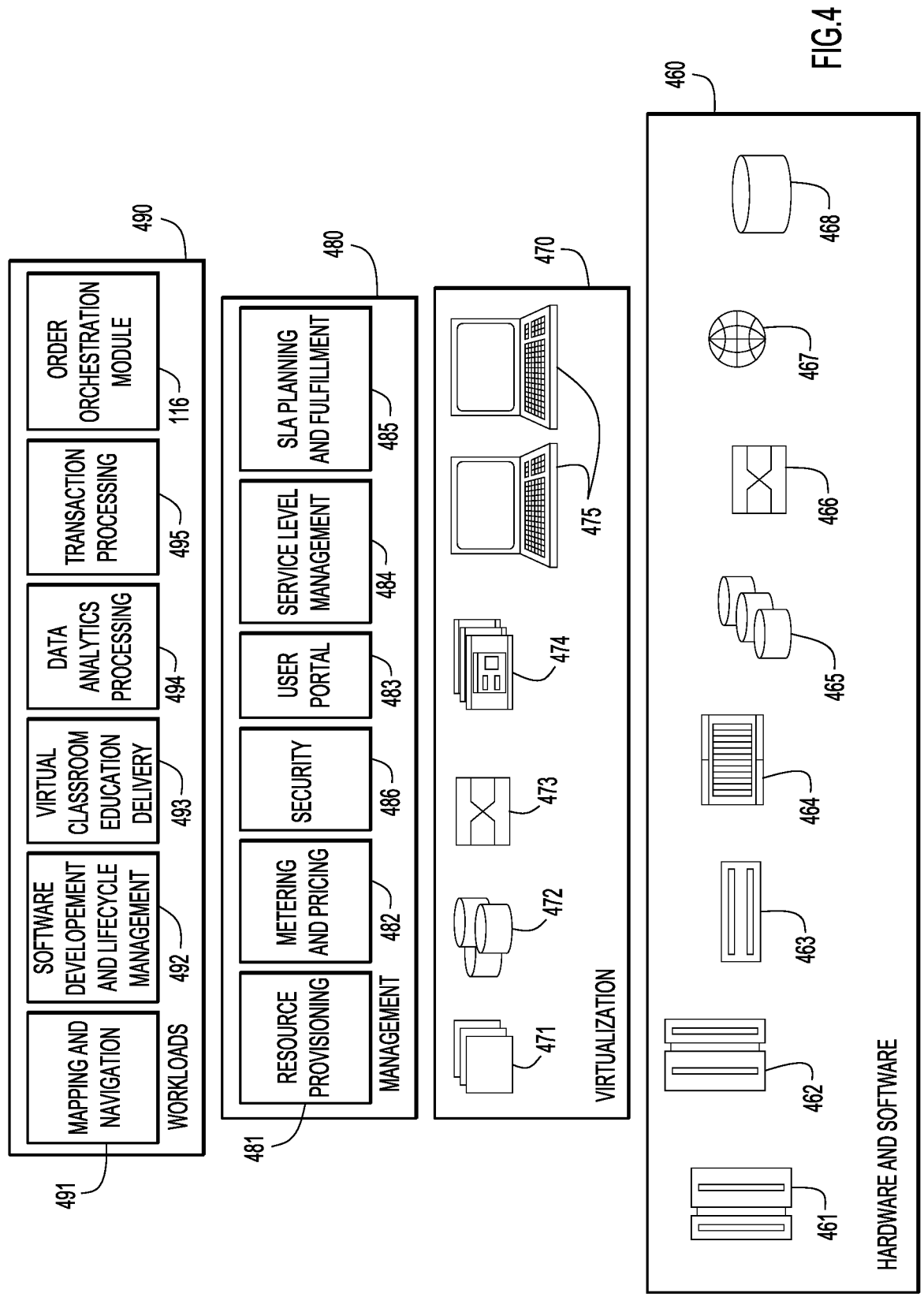
FIG. 4 is a diagrammatic illustration of abstraction model layers according to an embodiment of the present invention.

Referring now to FIG. 4, a set of functional abstraction layers provided by cloud computing environment 350 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example embodiment, management layer 480 may provide some or all of the functions for monitor system 110 (and/or for commerce system 140, order management system 150, warehouse management system 160, transportation management system 170, supplier order management system 180, and/or payment system 190) described herein. Resource provisioning 481 provides dynamic procurement of computing resources and other resources that are utilized to perform tasks within the cloud computing environment. Metering and pricing 482 provides cost tracking as resources are utilized within the cloud computing environment, and billing or invoicing for consumption of these resources. In one example, these resources may include application software licenses. Security 486 provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provides pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include: mapping and navigation 491; software development and lifecycle management 492; virtual classroom education delivery 493; data analytics processing 494; transaction processing 495; and order orchestrator module 116 (FIG. 1A) for monitoring orders as described herein.

An example of a computing node or device of cloud environment 350 (e.g., cloud computing node 310, etc.) may be computing device 210 described above for FIG. 2.

Figure 5:
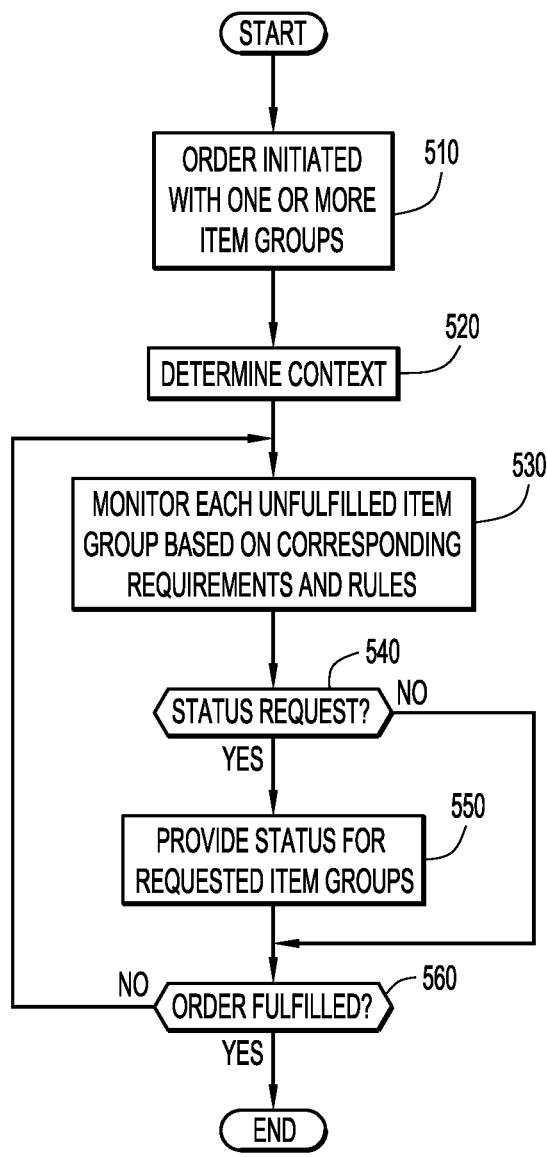
FIG. 5 is a procedural flowchart illustrating a manner of monitoring and adapting an order fulfillment process across plural systems associated with a supply chain according to an embodiment of the present invention.

A manner of monitoring an order fulfillment process across plural systems associated with a supply chain (e.g., via monitor system 110 and order orchestrator module 116) is illustrated in FIG. 5. However, other suitable processes may be monitored across plural systems in substantially the same manner described below.

Initially, jobs are configured by order orchestrator module 116 to be executed across plural systems of an enterprise. These jobs may have any desired frequency or intervals to be triggered (e.g., pre-defined, configurable, dynamically configurable, etc.), and collect information from the various systems and networked sensing devices 130 (e.g., Internet of Things (IoT) devices, etc.) for storage in database system 118. The jobs may monitor the systems and networked sensing devices, and collect various status and other information pertaining to orders (e.g., order history, personnel or users associated with order fulfillment at each system, completion times at the systems for corresponding portions of order fulfillment, etc.). The order orchestrator module is associated with process rules (e.g., in database system 118) configured based on ownership or handling of an order, traversal of the order life cycle, and paths of exceptions for order fulfillment. The process rules may include rules for monitoring the order fulfillment process and rules for performing order fulfillment.

An order is initiated at operation 510, preferably from commerce system 140 or order management system 150 processing a request for the order from a client system 114. The order may be associated with various characteristics (e.g., items or item identifiers (e.g., item ID), shipping method, order identifier, delivery date, etc.), where the order identifier (e.g., order number or identifier, confirmation number or identifier, etc.) may be used to identify and track the order across the plural systems performing order fulfillment.

The order may include one or item groups each including one or more items (e.g., goods, services, products, etc.) and associated with corresponding requirements for the item group (e.g., delivery or due date for the item group, etc.). An item group typically corresponds to a line item of the order. For example, an order may include a t-shirt and a set of several oranges (by weight). In this example case, the order includes two item groups, one group of the t-shirt and the other group of the set of oranges. The t-shirt and set of oranges may each have different delivery dates, and/or be provided by different storage facilities/providers, and thereby be individually monitored. By way of further example, an item group may designate a quantity of two or more for an item, where the quantity may be divided for different storage facilities/providers and/or separate shipments to fulfill the order. In this case, each divided quantity of the item group may be considered a different item group for individual monitoring. An order may contain any quantity of item groups including any quantity of the same or different items, where each item group being fulfilled differently (e.g., different storage facility/provider, different shipping, etc.) may be monitored individually.

The initiation of the order is detected by monitor system 110 to commence monitoring of the order as the order flows through the various systems performing order fulfillment. The order may flow through an order fulfillment process (e.g., similar to the process described above for FIG. 1B) initially configured in accordance with the characteristics and prescribed requirements for the order. The initiation of the order may be detected in various manners (e.g., via a communication or message from commerce system 140 or order management system 150, status or other information collected by jobs of order orchestrator module 116, etc.).

Database system 118 stores information collected by jobs of order orchestrator module 116. By way of example, the collected information may include: a context of an order with respect to ownership or handling of the order by a corresponding system (e.g., order management system, warehouse management system, transportation management system, etc.), a next step in the order fulfillment process, order status, and past orders of a similar nature; an item's department and promised lead time to delivery; an item's current and planned inventory stock position and velocity (e.g., turnover or cycle time); an item's sourcing location infrastructure, corresponding weather, and operational capacity; historical item velocity, supply/demand, and insufficient stock for orders specific to sourcing locations; end shopper's anxiety and curiousness based on past purchases and status inquiry history; end shopper's feedback, returns, and complaints; financial impact based on open to buy (or financial budget) and sudden change in forecasts; supplier and logistics partner's compliance (current and historical); weather at destination address; past order monitoring paradigms, corresponding failures/exceptions, and customer reactions; derived historical monitoring patterns for the above context; and past monitoring failures and exceptions. The collected information basically includes an order history of various characteristics of prior orders.

A context for an order (and each item group of the order) is determined at operation 520. The context is represented as a set of features derived from the collected information within database system 118. The context for an item group of the order is used to determine monitoring requirements for the item group. A context for an order is initially determined, and the order context is applied to each item group of the order. For example, an order may be associated with a customer (and other features), where the customer (and other features) is set at an order context level. A context for an item group of the order includes corresponding specific features for the item group, and inherits customer (and the other features) from the order context (e.g., the customer (and other features) of the order context are not stored for each item group to avoid unnecessary repetition/duplication).

A context for an order and/or item group may be associated with one or more elements of the collected information that serve as features for the context. By way of example, a context for an item group may include: item ID, promised date and time of delivery, requested quantity, supplier, customer, shipping address, node or system (e.g., warehouse, distribution center, store, etc.), inventory availability, carrier, and shipping service. The context may further include one or more elements from networked sensing devices 130 (e.g., weather, partner eco-system, local disruption events (e.g., traffic, etc.), manual overrides, information technology (IT) or other equipment failures, etc.). However, the context for an order or item group may include any quantity of any features from any relevant information (e.g., collected, monitored, and/or order information, etc.).

The context features are used to form a context feature vector for a corresponding item group for processing. The context feature vector includes one or more vector elements each including a value for a corresponding context feature. The context feature values may be converted to a numeric value for the context feature vector (e.g., a value on a numeric range or scale (e.g., 1 to 10, 1 to 100, etc.), a numeric value representing a type, level, or degree (e.g., for non-numeric data, such as weather, customer feedback, etc.), etc.).

Each item group is monitored in accordance with their corresponding monitoring requirements across the systems participating in order fulfillment (e.g., order management system 150, warehouse management system 160, transportation management system 170, etc.) at operation 530. The monitoring produces a status for each item group that may be stored to respond to status requests from users (e.g., via commerce system 140 and/or order management system 150). The status may be retrieved during monitoring from the various systems (e.g., order management system 150, warehouse management system 160, transportation management system 170, etc.), or from the information in database system 118 collected by jobs of order orchestrator module 116. The status and/or context of an item group dynamically changes based on the item group traversing the order fulfillment process.

When a status request is received for one or more item groups of the order as determined at operation 540, the status request is processed at operation 550 to retrieve a corresponding status for each requested item group. The retrieved status is provided to the requesting system (e.g., commerce system 140 and/or order management system 150) for presentation to a user.

When the order has not been fulfilled as determined at operation 560, the monitoring requirements of unfulfilled item groups may be updated and used to monitor those item groups at operation 530. The monitoring of item groups continues (e.g., from operation 530) until the order is fulfilled as determined at operation 560.

Figure 6:
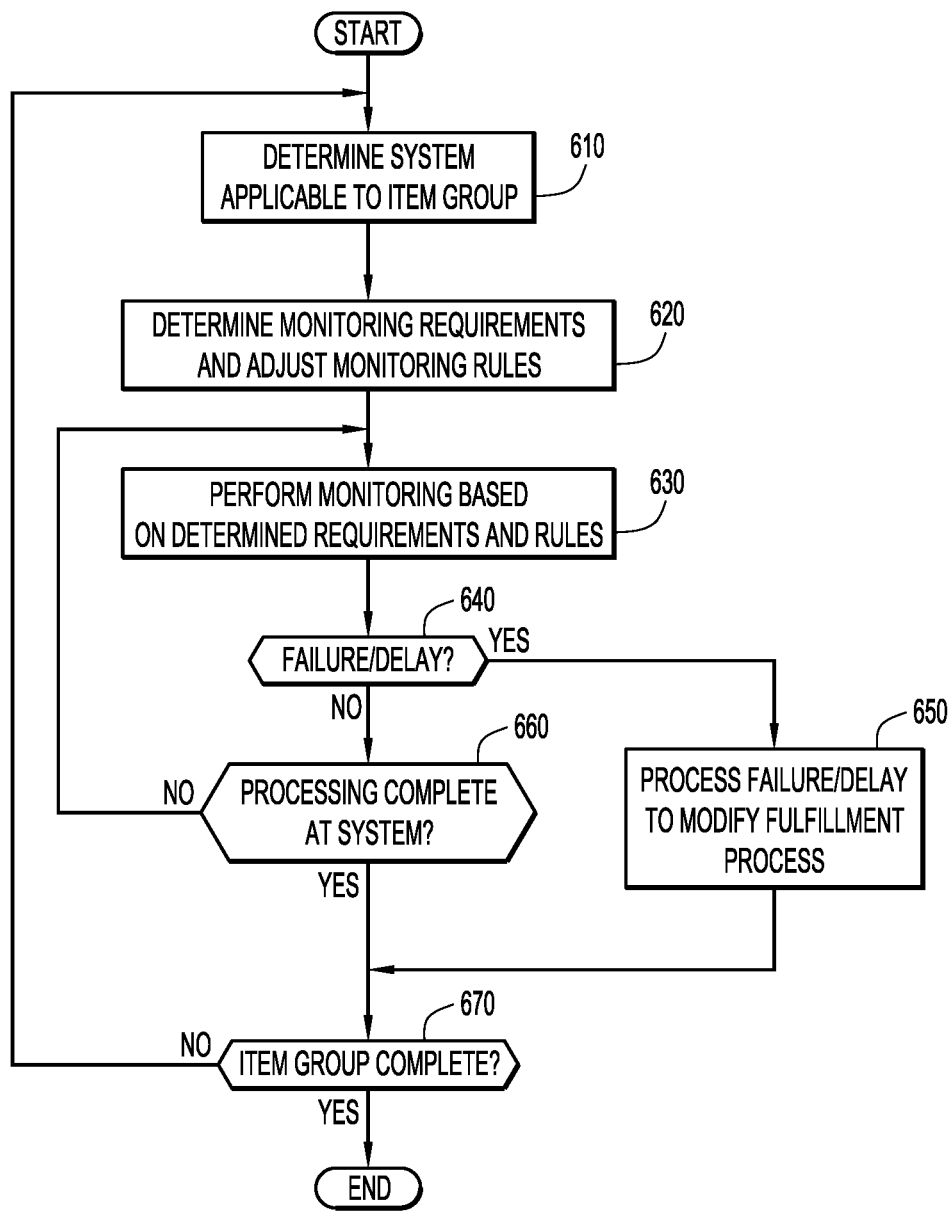
FIG. 6 is a procedural flowchart illustrating a manner of monitoring and adapting an order fulfillment process for an item group of an order across plural systems associated with a supply chain according to an embodiment of the present invention.

A manner of monitoring and adapting an order fulfillment process for an item group of an order across plural systems associated with a supply chain (e.g., via monitor system 110 and order orchestrator module 116) is illustrated in FIG. 6. This manner of monitoring may correspond to operation 530 of FIG. 5. Initially, a context is determined for an item group of an order as described above (e.g., for operation 520 of FIG. 5). The context is used to predict the applicable system (e.g., order management system 150, warehouse management system 160, transportation management system 170, etc.) to handle the order fulfillment process for the item group at operation 610. The applicable system may be predicted or determined for the item group based on the process rules. These rules may indicate a condition (or status), and the corresponding system associated with a current or future portion of the order fulfillment process based on the status and context. For example, a process rule may indicate that a status of "Notified to Fulfillment Center" indicates a transition from an order management system to a warehouse management system for handling the order fulfillment.

The monitoring requirements for the item group are determined by machine learning at operation 620. Order orchestrator module 116 utilizes monitoring rules (e.g., stored in database system 118) to control monitoring of item groups of the order. The monitoring rules preferably include a condition (e.g., a status), a time interval for the condition, and an action to perform when the condition is satisfied (e.g., an item group remains in a same status for at least as long as the time interval). The action may include providing an alert and/or modifying the order fulfillment process to satisfy the corresponding requirements for the item group. However, the monitoring rules may be of any format and quantity, and may specify any quantity of any types of parameters (e.g., conditions, time intervals, etc.) and corresponding actions. The monitoring rules for an item group are adjusted based on the determined monitoring requirements. For example, a time interval may be determined to be improper for adequately monitoring an item group, and may be adjusted (e.g., increased or decreased) in accordance with the determined monitoring requirements.

Once the monitoring rules are adjusted, monitoring of the item group is performed according to the corresponding monitoring rules at operation 630. The monitoring includes periodically checking conditions of the corresponding monitoring rules according to the prescribed time intervals for satisfaction of the conditions. The monitoring retrieves the status for the item group (e.g., from the various systems, from information collected by jobs of orchestrator module 116, etc.), detects satisfaction of conditions of monitoring rules based on the retrieved status, and executes corresponding monitoring rule actions. When an exception, such as a failure or delay, is detected for the item group based on satisfaction of a condition of a corresponding monitoring rule (and/or a current status) as determined at operation 640, the failure or delay is processed for the item group at operation 650. Once the failure or delay is processed, completion of fulfillment of the item group is determined at operation 670. When the item group is not fulfilled, the next applicable system is dynamically determined or predicted at operation 610 for the item group, and the monitoring process repeats (e.g., from operation 610) until the item group is fulfilled as determined at operation 670.

When a failure or delay has not occurred as determined at operation 640, the status of the item group is examined to determine completion of processing by a current system handling the order fulfillment process for the item group. When processing of the item group remains within the same system (e.g., based on the monitored status and context and/or process rules) as determined at operation 660, monitoring of the item group is performed at operation 630 as described above. When processing by a current system handling the order fulfillment process for the item group is complete and the item group is not fulfilled as determined at operation 670, the next applicable system is dynamically determined or predicted at operation 610 for the item group. The above monitoring process repeats (e.g., from operation 610) until the item group is fulfilled as determined at operation 670.

Figure 7:
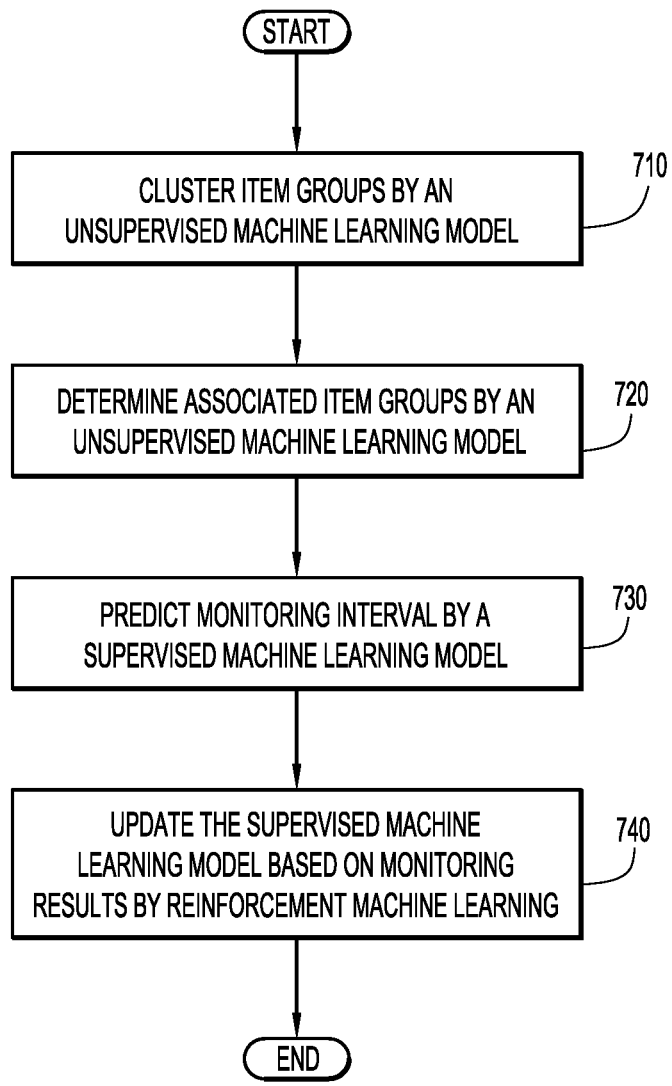
FIG. 7 is a procedural flowchart illustrating a manner of determining monitoring requirements for an item group of an order according to an embodiment of the present invention.

A manner of determining monitoring requirements for an item group of an order (e.g., via monitor system 110 and order orchestrator module 116) is illustrated in FIG. 7. The manner of determining monitoring requirements may correspond to operation 620 of FIG. 6. Initially, a context and an applicable system are determined for the item group as described above (e.g., for operation 520 of FIG. 5 and operation 610 of FIG. 6). An unsupervised machine learning model is employed to cluster item groups in an order history based on the item group being monitored at operation 710. The order history includes information collected by jobs of order orchestrator module 116, and is stored in database system 118 as described above. Item groups within the order history are clustered across the systems based on features of the context of the monitored item group derived from the collected information in database system 118. In other words, the clustered item groups are similar in nature and have similar treatment (e.g., similar items, similar delivery times, etc.).

The item groups of the order history and the monitored item group are clustered by the unsupervised machine learning model based on the context features for the monitored item group. The context features preferably include one or more elements from networked sensing devices 130 (e.g., weather, partner eco-system, local disruption events (e.g., traffic, etc.), manual overrides, information technology (IT) or other equipment failures, etc.). The elements or dimensions of the context feature vector of the monitored item group (and desired monitoring interval) defines a feature space for the clustering.

The unsupervised machine learning model performs cluster analysis to group order data that has not been labeled, classified, or categorized. The cluster analysis identifies common characteristics in the order data, and determines results based on the presence or absence of the characteristics in data for a next processed order. The unsupervised machine learning model preferably employs K-means clustering, however any conventional or other clustering techniques (e.g., hierarchical clustering, etc.) may be used to cluster the item groups.

The unsupervised machine learning model clusters the item groups within the order history and the monitored item group in the feature space to form clusters of item groups by processing the context feature vector of the monitored item group (and monitoring interval) and corresponding context feature vectors (and monitoring intervals) of the item groups from the order history. The context feature vectors of the item groups from the order history preferably have substantially the same features as the context feature vector for the monitored item group. The formed clusters are each associated with a corresponding monitoring interval. The clustering may be performed to produce any quantity of clusters each associated with any desired monitoring interval (e.g., 15 minutes, 30 minutes, 1 hour, 2 hours, 4 hours, 8 hours, etc.). For example, at least three clusters may be produced and associated with any combinations of 15 minutes, 30 minutes, 1 hour, 2 hours, 3 hours, 4 hours, and 8 hours. The different monitoring intervals and context of the monitored item group may form reference points for forming the clusters of the K-means or other clustering technique. Instances of the monitored item group with different monitoring intervals may be included in the clustering, where clusters containing the monitored item group (with the different monitoring interval) include item groups from the order history similar to the monitored item group and having a monitoring interval similar to the monitoring interval associated with the cluster (e.g., the similarity to the monitoring interval may be based on the clustering technique). The similar item groups from the order history provide various combinations of features for item groups associated with the different monitoring intervals.

The unsupervised machine learning model may be implemented by any conventional or other machine learning models (e.g., mathematical/statistical models, classifiers, feed-forward, recurrent or other neural networks, etc.). For example, neural networks may include an input layer, one or more intermediate layers (e.g., including any hidden layers), and an output layer. Each layer includes one or more neurons, where the input layer neurons receive input (e.g., context feature vectors), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, the unsupervised machine learning model may be trained with a training set of unlabeled features and/or new input features, where the neural network attempts to produce the provided data and uses an error from the output (e.g., difference between inputs and outputs) to adjust weight (and bias) values. The output layer of the neural network indicates a cluster for input data. By way of example, the output layer neurons may indicate a specific cluster or an identifier of the specific cluster. Further, output layer neurons may be associated with different clusters and indicate a probability of the input data belonging to the associated cluster. The cluster associated with the highest probability is preferably selected for the input data.

Item groups of the order history associated with the monitored item group may further be identified at operation 720. The monitored item group may be applied to an unsupervised machine learning model to determine item groups in the order history associated with the monitored item group. The unsupervised machine learning model may receive one or more features of the item group (e.g., pertaining to the context, systems, status, networked sensing devices 130, etc.) to identify associated item groups in the order history. By way of example, the unsupervised machine learning model employs an Apriori algorithm to determine associated item groups within the order history. However, any conventional or other techniques may be employed to determine associated item groups within the order history.

The Apriori algorithm identifies frequently occurring items, and extends them to increasingly larger item sets provided the item sets appear sufficiently. The item sets are used to determine association rules indicating trends. For example, the Apriori algorithm may initially count the number of occurrences (referred to as support) of each item of the monitored item group in the order history with the corresponding features (e.g., customer attributes, item attributes, etc.), and prune the resulting item sets not meeting an occurrence threshold. The remaining item sets are combined to form different combinations, where the occurrence of each combination is counted in the order history. The combined item sets not meeting the occurrence threshold are pruned (e.g., and not included for generating future larger item sets). The process continues until no combined item sets remain that satisfy the occurrence threshold. The combined item sets satisfying the occurrence threshold and containing the items of the monitored item group may be identified and associated to the monitored order. In other words, the algorithm identifies repeated patterns of similar customers ordering similar items of the monitored item group. The association is based on a combination of customer attributes at the order level of the context and item attributes at an individual item group level of the context. Any quantity of any desired attributes may be used for the association (e.g., customer attributes (name, address, etc.), item attributes (item ID, supplier, shipper, etc.), etc.).

The associated orders may be determined in addition, or as an alternative, to the clustering by unsupervised machine learning described above. The unsupervised machine learning model for determining associated orders may be implemented by any conventional or other machine learning models (e.g., mathematical/statistical models, classifiers, etc.).

The resulting clusters of item groups and/or associated item groups are used to form a training set to train a supervised machine learning model to predict monitoring intervals for the monitored item group. The clusters encompass similar sets of item groups (e.g., order create, order cancelations, order delays, order payment, etc.) in the features of the context. The associated item groups encompass associations of customer, item, dates, and/or frequency in the features of the context. The context feature vector of the monitored item group is provided to the supervised machine learning model to predict a monitoring interval for the monitored item group at operation 730. Thus, unsupervised machine learning is used to generate a reduced and focused training set to train a supervised machine learning model to dynamically predict the monitoring interval. This reduces training (and processing) time, and enhances accuracy of the supervised machine learning model.

The supervised machine learning model determines or predicts the monitoring interval at an individual item group level of an order since the requirements may be different for item groups of an order due to a nature of an item type, delivery date, fulfillment location, etc. Feature vectors for the item groups in the training set and corresponding monitoring intervals are used to train the supervised machine learning model to learn or map item group features to monitoring intervals. Since the context and association are preferably based on various information (e.g., relating to customer, node or system, etc.), the training set derived from the unsupervised machine learning models accounts for this information. Accordingly, the supervised machine learning model predicts the appropriate monitoring intervals for orders by customers for the corresponding systems. In addition, since the context preferably includes information from networked sensing devices 130 (e.g., relating to one or more from a group of weather, partner eco-system, local disruption events (e.g., traffic, etc.), manual overrides, information technology (IT) or other equipment failures, etc.), the training set derived from the unsupervised machine learning models accounts for this information. Accordingly, the supervised machine learning model may predict the appropriate monitoring intervals based on the information provided by the networked sensing devices.

The supervised machine learning model is preferably implemented by a multi-linear regression model which caters to multiple dimensions of data sets. The model may employ an equation relating weighted item group feature vector elements to a monitoring interval. For example, the model may employ an equation for the item group to determine the monitoring interval for the item group based on the elements of the context feature vector for the item group. However, any quantity of any desired features (e.g., from the collected information in database system 118, etc.) may be used for the model. The weights for context feature vector elements used by the model may be determined by training with corresponding features from the training set (e.g., generated by the unsupervised machine learning). The difference between known values and outputs produced by the model may be used by various conventional or other techniques (e.g., gradient descent, etc.) to adjust the weights until a desired tolerance for the model output is attained (e.g., desired error or difference from the known values from the training set).

However, any conventional or other machine learning models may be employed (e.g., mathematical/statistical, classifiers, feed-forward, recurrent or other neural networks, etc.). For example, neural networks may include an input layer, one or more intermediate layers (e.g., including any hidden layers), and an output layer. Each layer includes one or more neurons, where the input layer neurons receive input (e.g., context feature vectors), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, the supervised machine learning may be performed with context feature vectors of the training set as input and corresponding monitoring intervals as outputs, where the neural network attempts to produce the provided output (or monitoring intervals) and uses an error from the output (e.g., difference between produced and known outputs) to adjust weight (and bias) values (e.g., via backpropagation or other training techniques). The output layer of the neural network indicates a monitoring interval for the item group of the input data. By way of example, the output layer neurons may indicate a specific monitoring interval or an adjustment for a current monitoring interval. Further, output layer neurons may be associated with different monitoring intervals or adjustments and indicate a probability for the monitoring interval or adjustment. The monitoring interval or adjustment associated with the highest probability is preferably selected as the monitoring interval for the input data.

Once the supervised machine learning model is trained, the context feature vector for the monitored item group is provided to the trained supervised machine learning model to predict a monitoring interval for the item group (e.g., the monitoring interval indicates the frequency or time interval for checking the condition of the monitoring rule for the item group). The corresponding monitoring rule for the item group may be dynamically adjusted based on the predicted monitoring interval. For example, the monitoring rules preferably include a condition (e.g., a status), a time interval for the condition, and an action to perform when the condition is satisfied (e.g., an item group remains in a same status for longer than the time interval) as described above. The time interval for the condition may be dynamically updated based on the predicted monitoring interval. By way of further example, a monitoring rule for an item may indicate a monitoring interval of six hours which is inadequate for a prescribed next day delivery. Accordingly, the monitoring interval is dynamically evaluated and changed to check the monitoring rule in a period of a number of minutes (e.g., 30 minutes, etc.) in accordance with the delivery date. The above operations may be performed for each monitoring rule corresponding to the item group for an associated system handling the order fulfillment to dynamically adjust the monitoring interval for that monitoring rule.

Reinforcement machine learning techniques are employed to update the supervised machine learning model based on monitoring results at operation 740. Initially, reinforcement learning is based on environment interaction. A current state and reward is received, and an action is selected and performed. The environment transitions to a new state based on the action, and the reward associated with the transition is determined. Reinforcement learning determines a manner that maximizes the reward. In other words, the reinforcement learning rewards accurate monitoring and penalizes for failures or missed monitoring circumstances. Conventional or other explore and exploit mechanisms of reinforcement learning are preferably employed. However, any conventional or other reinforcement learning techniques may be utilized.

By way of example, the reinforcement learning techniques may be used to adjust the supervised machine learning model to favor monitoring intervals providing successful monitoring and disfavor monitoring intervals that failed to timely detect a failure or delay (e.g., the success and failure of monitoring may be derived from information within database system 118). For example, a reward variable may be used as part of the multi-linear regression model, and/or weights of the multi-linear regression model may be adjusted based on success or failure of predicted monitoring intervals. Further, the training set may be updated (by the unsupervised machine learning) based on updated data for item groups reflecting the successful or failed monitoring and the multi-linear regression model may be re-trained.

Moreover, the feature vectors of the neural network training set may include reward/penalty features (e.g., reward/penalty features/values, etc.) that may be adjusted based on success or failure of predicted monitoring intervals. Further, the training set may be updated (by the unsupervised machine learning) based on updated data for item groups reflecting the successful or failed monitoring. In addition, the output probabilities for monitoring intervals may be adjusted based on success or failure of predicted monitoring intervals. The neural network may be re-trained (by the updated training set) with these adjustments to alter weight (and bias) values for modify predictions of the monitoring intervals.

Figure 8:
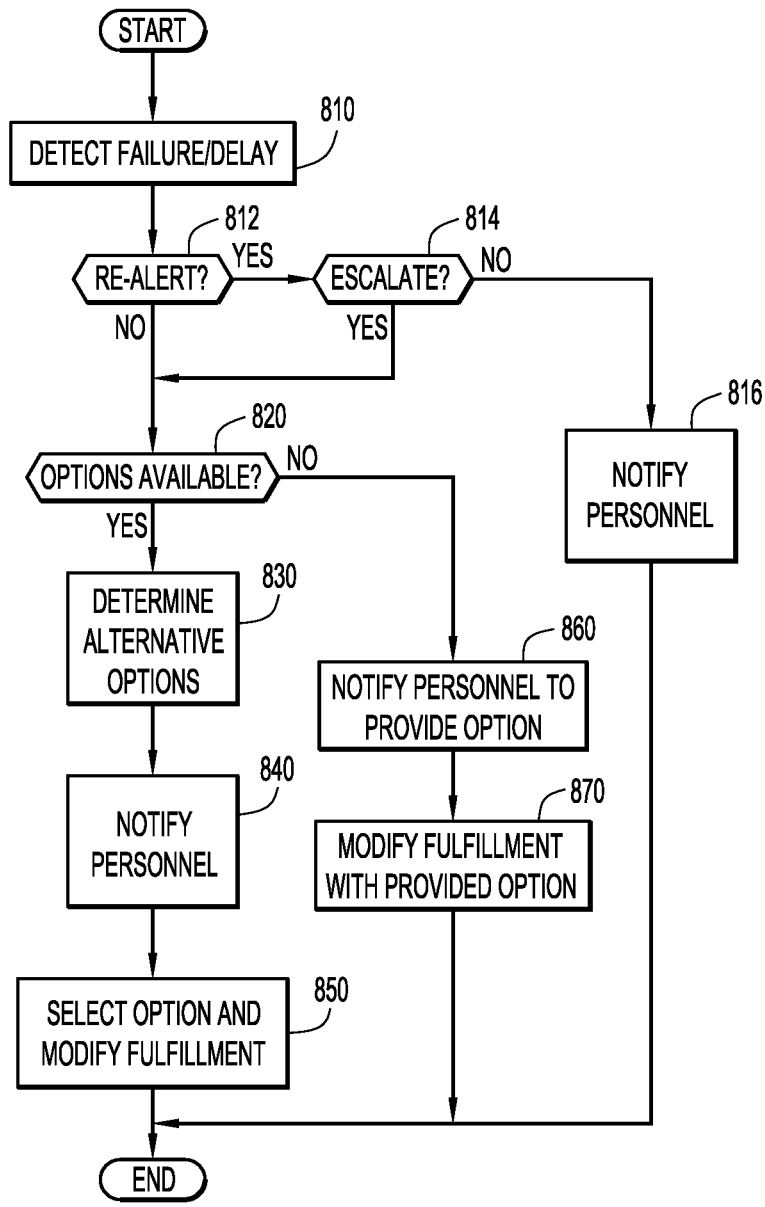
FIG. 8 is a procedural flowchart illustrating a manner of processing a detected failure or delay in an order fulfillment process for an item group of an order according to an embodiment of the present invention.

A manner of processing a detected failure or delay in an order fulfillment process for an item group (e.g., via monitor system 110 and order orchestrator module 116) according to an embodiment of the present invention is illustrated in FIG. 8. This manner of processing a detected failure or delay may correspond to operation 650 of FIG. 6. Initially, an exception, such as a failure or delay, in fulfillment of an item group of an order is detected during monitoring at operation 810 (e.g., corresponding to operation 640 of FIG. 6). The failure or delay may be detected for an item group based on the conditions of the monitoring rules being satisfied, or a current status of the item group (e.g., the time interval of a rule being exceeded, a status indicating a failure or delay (such as a "Validation Failure Hold" status), etc.).

The failure or delay is examined with respect to a re-alert or reminder. For example, a prior change to the order fulfillment process for an item group may be progressing slowly and require a reminder to certain personnel (e.g., the progress and reminder may be based on status, rules, etc.). When the prior change to the order fulfillment process is projected (or predicted) to not satisfy the prescribed requirements (or advance progress of the order), escalation of the fulfillment process may be provided (e.g., based on escalation or other rules, etc.). The time until a delivery date may be utilized for comparison with times for completion for remaining portions of order fulfillment (e.g., packing time, shipping time, times associated with conditions from networked sensing devices 130, such as weather, and equipment or other failures, etc.) to determine (or predict) satisfaction of prescribed requirements. The times for completion may be indicated in monitoring rules (based on the status) and/or stored in database system 118.

When the failure or delay relates to a re-alert, and escalation is not required as determined at operations 812 and 814, appropriate personnel (or users) are determined and an electronic notification or reminder (e.g., email, text, voice message, etc.) is sent to the determined personnel at operation 816. The personnel are determined based on personnel associated with the prior change determined when the order fulfillment process is modified. The change and associated personnel may be stored in database system 118, and utilized to determine the personnel for the notification.

When the failure or delay is not related to a re-alert, or escalation is desired through alternative options, availability of options (of actions) for fulfilling the item group of the order in light of the failure or delay is determined at operation 820. When options are available, the options available for fulfilling the item group of the order in light of the failure or delay are determined at operation 830. The contextual understanding of the item group from determination of the appropriate monitoring interval is used for service discovery (e.g., either server side or client side service discovery modes) to identify options and facilitate proactive monitoring of the options (e.g., via conventional or other cloud orchestration providers (e.g., KUBERNETES, etc.)). The options are determined based on logic (or rules) that specify actions in response to occurrence of conditions. For example, the logic or rule may indicate to identify another warehouse or storage facility containing the item group in response to a delay in the current warehouse, identify a different shipper or method of shipping to expedite transport, etc. The actions are associated with completion times (e.g., packing time, shipping time, times associated with conditions from networked sensing devices 130, such as weather, and equipment or other failures, etc.) that are used to identify options that meet prescribed requirements of the item group (e.g., delivery or due date). For example, the time between a detection of the failure or delay and delivery date may be utilized to identify options completed within that time frame in order to fulfill the item group of the order. The times for completion may be stored in (and retrieved from) database system 118.

When the prescribed requirements for the item group are determined (or predicted) to be satisfied despite the failure or delay, the order fulfillment process may be maintained, or another option may be selected and performed as described below. The time until a delivery date may be utilized for comparison with times for completion for remaining portions of order fulfillment (e.g., packing time, shipping time, times associated with conditions from networked sensing devices 130, such as weather, and equipment or other failures, etc.) to determine (or predict) satisfaction of prescribed requirements.

Appropriate personnel (or users) are determined and an electronic notification (e.g., email, text, voice message, etc.) is sent to the determined personnel at operation 840. The notification may indicate occurrence of the detected failure or delay and determined options. The determined options may be dynamically ranked (by monitor system 110) based on various criteria (e.g., shortest completion time for order fulfillment, lowest cost, etc.). The personnel may be listed within the rules for the options (e.g., stored in database system 118) and associated with the actions to perform, or may be retrieved from database system 118 based on various attributes (e.g., action, status, system, etc.).

An option is selected at operation 850 and the fulfillment process for the item group is modified in accordance with the selected option. For example, the electronic notification may indicate the determined options (and/or one or more recommended options), and personnel receiving or associated with the notification may select a desired option which is provided to monitor system 110. Failure to respond to the notification within a prescribed time interval may trigger a re-alert described above. The modified fulfillment for the item group is analyzed to determine the appropriate system and monitoring intervals (e.g., including providing re-alerts for the item group and escalation) as described above. Further, personnel associated with the modified fulfillment are determined (e.g., based on rules for the options, attributes (e.g., action, status, system, etc.), etc.), and may be stored in database system 118. The personnel may be utilized for notifications. Control or performance of the order fulfillment process is transferred from the current system (of the failure or delay) to the determined system for order fulfillment.

Alternatively, the available options may be dynamically ranked and automatically selected (by monitor system 110) based on various criteria (e.g., shortest completion time for order fulfillment, lowest cost, etc.). The modified fulfillment for the item group is analyzed to determine the appropriate system and monitoring intervals (e.g., including providing re-alerts for the item group and escalation) as described above. Further, personnel associated with the modified fulfillment are determined (e.g., based on rules for the options, attributes (e.g., action, status, system, etc.), etc.), and may be stored in database system 118. The personnel may be utilized for notifications. Control or performance of the order fulfillment process is transferred from the current system (of the failure or delay) to the determined system for order fulfillment.

When options are unavailable as determined at operation 820, appropriate personnel (or users) are determined and an electronic notification (e.g., email, text, voice message, etc.) is sent to the determined personnel at operation 860 to manually intervene and provide an option. Failure to respond to the notification within a prescribed time interval may trigger a re-alert described above. The personnel may be retrieved from database system 118 based on various attributes (e.g., action, status, system, etc.), or may be listed within database system 118 associated with the order fulfillment.

Alternatively, an option may be provided automatically based on machine learning of prior actions taken by personnel. For example, a machine learning model may be employed, and trained to map feature vectors of the item group (representing the context) to the prior actions taken by personnel. A training set includes feature vectors of prior item groups as inputs and corresponding actions as outputs, and is applied to the machine learning model to determine appropriate actions. For example, when personnel repeatedly (e.g., a threshold number of times) performed an action (e.g., change delivery, notify a person, etc.) for a similar order situation, this action may be learned and automatically performed to resolve the failure or delay.

The machine learning model may be implemented by various machine learning models (e.g., classifiers, feedforward, recurrent or other neural networks, etc.). By way of example, neural networks for determining an appropriate action may include an input layer, one or more intermediate layers (e.g., including any hidden layers), and an output layer. Each layer includes one or more neurons, where the input layer neurons receive input (e.g., context feature vectors), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, the learning may be performed with a training set of feature vectors (e.g., context feature vectors) of prior item groups as input and corresponding actions as outputs, where the neural network attempts to produce the provided output (or action) and uses an error from the output (e.g., difference between produced and known outputs) to adjust weight (and bias) values (e.g., via backpropagation or other training techniques). The output layer of the neural network indicates an action for input data. By way of example, the output layer neurons may indicate a specific action or an identifier for the specific action. Further, output layer neurons may be associated with different actions and indicate a probability or score for the action. The action associated with the highest probability or score is preferably selected.

Once the machine learning model is trained, a feature vector for the item group is provided to the trained machine learning model to determine an action for resolving the failure or delay.

The order fulfillment process for the item group is modified in accordance with the determined option at operation 870. The modified fulfillment for the item group is analyzed to determine the appropriate system and monitoring intervals (including re-alerts for the item group and escalation) as described above. Further, personnel associated with the modified fulfillment are determined (e.g., based on rules for the options, attributes (e.g., action, status, system, etc.), etc.), and may be stored in database system 118. The personnel may be utilized for notifications. Control or performance of the order fulfillment process is transferred from the current system (of the failure or delay) to the determined system for order fulfillment.

Operation of present invention embodiments is described with respect to example scenarios. In an example scenario, a user places an order for a t-shirt and oranges on a website. The user receives an e-mail pertaining to an "Order Confirmation" with a delivery date of three days from the order placement for the t-shirt and one day from the order placement for the oranges.

Oranges and t-shirts are fulfilled from different fulfillment centers on different carriers. An order management system has a set of monitoring rules, including:

a) If an order remains in a "Created" status for more than 6 hours, raise an alert to personnel;

b) If an order remains in a "Validation Failure Hold" status for more than 4 hours, raise an alert to personnel;

c) If an order remains in a "Notified to Fulfillment Center" status for more than 24 hours, raise an alert to personnel; and d) If an order is not "Shipped" for a threshold number of hours after expected shipment date, raise an alert to personnel.

The statuses are typically viewed in conventional systems only from the perspective of the order management system. This may lead to various disadvantages. In particular, the order management system monitors all the rules in the same fashion for both oranges and t-shirt line items of the order without consideration of the delivery date and fulfillment center. Since oranges are promised to be delivered in one day, a monitoring frequency for identifying exceptions is fixed and status updates are limited to the order management system. This provides inadequate monitoring to enable performance of proactive actions, thereby inducing delays in orange delivery. The delays cause customer dissatisfaction that leads to manual intervention for monitoring which is inefficient and consumes significant productive effort. This also leaves less time for personnel to explore alternative choices for delivery, and business is eventually impacted from a potential loss of sale.

In contrast, a present invention embodiment views the statuses from the perspective of the systems involved in order fulfillment, including the order management system, warehouse management system, and transportation management system. The present invention embodiment monitors the order in the "Created" status for the t-shirt and oranges differently based on context of item velocity and promised delivery date. In this case, the monitoring of oranges in the "Created" status for six hours is inadequate (e.g., for one day delivery), and is dynamically evaluated to a number of minutes (e.g., 30 minutes, etc.) based on past monitoring paradigms.

Since oranges are promised to be delivered in one day, a monitoring frequency for identifying exceptions and status updates is determined to be small during a status of "Validation Failure Hold". For example, the monitoring frequency may be a number of minutes (e.g., 40 minutes based on past monitoring paradigms). Since the t-shirt has a longer delivery time, the t-shirt may be monitored every four hours (as indicated in the monitoring rule).

After notification to the fulfillment center (e.g., a "Notified to Fulfillment Center" status), the present invention embodiment understands that the ownership or handling of shipment delivery resides with the warehouse management system, and automatically re-evaluates the monitoring rules on this shipment dynamically. The present invention embodiment determines that oranges have not been packed for the last two hours after the notification, and raises an alert to warehouse personnel. The present invention embodiment predicts that compliance will not be met for the promised delivery date of oranges from the warehouse operations perspective, and recommends alternative choices to upgrade to "Express Shipping" to accommodate customer promised delivery dates leveraging the original planned carrier. The present invention embodiment also provides a cost of upgrading to personnel to arrange for necessary approvals based on customer (e.g., gold, silver, platinum, etc.) standing or competition offering, and/or dollar impact of delayed delivery. This enhances proactive monitoring to resolve impediments for planned deliveries, while creating a satisfying experience for the customer.

In another example scenario, a user places an order on a website at 11 AM. The user receives an e-mail pertaining to an "Order Confirmation" with a delivery date of 3 days from placement of the order.

The statuses are typically viewed in conventional systems only from the perspective of the order management system. Thus, the user may log in to the website at various times to check the order status. In particular, the next day after order placement at LOAM, a displayed status is "Order Notified to Fulfillment Center", while at 6 PM on the next day, the displayed status remains "Order Notified to Fulfillment Center". The second day after order placement at 7 AM and at 9 AM, the displayed status is still "Order Notified to Fulfillment Center". The displayed status changes at 12 PM on the second day to "Shipment Ready for Dispatch", and at 8 PM on the second day further changes to "Shipment Dispatched". The displayed status remains as "Shipment Dispatched" on the third day after order placement at 9:30 AM and 3:30 PM, and the order is delivered on the third day at 4:45 PM and the displayed status changes to "Shipment Delivered".

In contrast, a present invention embodiment views the statuses from the perspective of the systems involved in order fulfillment, including the order management system, warehouse management system, and transport management system. In particular, the user logs in to the website at various times to check the order status. At LOAM on the next day after order placement, the displayed status is "Order Notified to Fulfillment Center" (corresponding to the status described above), while at 6 PM on the next day the displayed status changes to "Shipment is Ready for Packing" (as opposed to "Order Notified to Fulfillment Center" described above). At 7 AM on the second day after order placement, the displayed status remains "Shipment is Ready for Packing" (as opposed to "Order Notified to Fulfillment Center" described above), and at 9 AM on the second day the displayed status is "Shipment Packing Completed" (as opposed to "Order Notified to Fulfillment Center" described above).

At 12 PM on the second day the displayed status is "Shipment Ready for Dispatch" (corresponding to the status described above), and at 8 PM on the second day the displayed status changes to "Shipment Dispatched" (corresponding to the status described above). On the third day after order placement at 9:30 AM the displayed status is "In Transit and x hrs away to be delivered" (as opposed to "Shipment Dispatched" described above), while at 3:30 PM on the third day the displayed status changes to "In Transit and y hrs away to be delivered" (where y is less than x indicating the order delivery is sooner) (as opposed to "Shipment Dispatched" described above). The order is delivered on the third day at 4:45 PM, and the displayed status is "Shipment Delivered" (corresponding to the status described above).

In yet another example scenario, a user is a replenishment manager of an entity and has placed a purchase order (from an entity order management system) to (a supplier order management system of) a supplier at 7 AM for an item. The user receives a confirmation about the order acceptance from the supplier with a delivery date of 5 days from order placement for the item on all the units.

The statuses are typically viewed in conventional systems only from the perspective of the order management system. Thus, the user may check the entity order management system at various times to check the order status. In particular, at LOAM on the next day after order placement the displayed status is "Order Accepted", and remains in this status on the second day after order placement at LOAM and the third day after order placement at LOAM. On the fourth day after order placement at LOAM, the displayed status is "Shipment Ready for Dispatch", and on the fifth day after order placement at LOAM the displayed status changes to "Shipment Dispatched". The displayed status remains "Shipment Dispatched" on the fifth day at 12 PM and 3:30 PM, and at 4:45 PM on the fifth day the order is delivered and the displayed status is "Shipment Delivered".

In contrast, a present invention embodiment views the statuses from the perspective of the systems involved in order fulfillment, including the order management system, supplier order management system, warehouse management system, and transport management system. In particular, the user logs in to the entity order management system at various times to check the order status. At LOAM on the next day after order placement, the displayed status is "Order Accepted" (corresponding to the status described above), and on the second day after order placement at LOAM the displayed status is "Shipment Staged for Packing" (as opposed to "Order Accepted" described above). At LOAM on the third day after order placement the displayed status is "Shipment Packing Completed" (as opposed to "Order Accepted" described above), while on the fourth day after order placement at LOAM the displayed status changes to "Shipment Ready for Dispatch" (corresponding to the status described above). At LOAM on the fifth day after order placement the displayed status is "Shipment Dispatched" (corresponding to the status described above), and at 12 PM on the fifth day the displayed status changes to "In Transit and x hrs away to be delivered" (as opposed to "Shipment Dispatched" described above). At 3:30 PM on the fifth day after order placement the displayed status changes to "In Transit and y hrs away to be delivered" (where y is less than x indicating that the order delivery is sooner) (as opposed to "Shipment Dispatched" described above). The order is delivered at 4:45 PM on the fifth day after order placement, and the displayed status is "Shipment Delivered" (corresponding to the status described above).

Present invention embodiments provide several advantages. For example, a technology improvement pertains to dynamically deriving a monitoring interval or frequency for a promised item group during the order fulfillment process by machine learning techniques, and applying the dynamically derived monitoring frequency to the item group throughout the order fulfillment process. Current technologies monitor line items or orders completely based on manual configurations. Further, current manual configuration is limited to a product/item level or as a generic rule for multiple/all orders (e.g., monitor same day deliveries every hour and all other deliveries every 2 hours). Present invention embodiments dynamically define the monitoring frequency on a line item by line item basis (rather than using the same frequency for various line items of multiple orders).

Further, present invention embodiments control the order fulfillment process based on a predicted failure towards meeting a promised date/time by dynamically transferring control to the next application/system to process a subsequent order fulfillment stage. In other words, present invention embodiments dynamically change the flow of the order fulfillment process across the systems, and dynamically switch between the systems, based on the changed flow, to perform the stages of the order fulfillment process. This reduces computational resources since systems do not remain in a stagnant, non-progressing, or idle state for extended periods of time, and do not waste computational and other resources in attempting to meet an unattainable requirement (or delivery date). Moreover, present invention embodiments may transfer control between specific systems within a location, or alter processing of systems. For example, the monitor system may change to a different warehouse and send controls to control an inventory system (e.g., automated item retrieval, packing, etc.) of the different warehouse to retrieve and/or pack an item, while sending controls to systems of the current warehouse to terminate or cancel a job.

In addition, present invention embodiments employ one or more machine learning models to generate a reduced and focused training set to train another machine learning model to dynamically predict the monitoring interval. This reduces training (and processing) time, and enhances accuracy of the other machine learning model.

It will be appreciated that the embodiments described above and illustrated in the drawings represent only a few of the many ways of implementing embodiments for monitoring and adapting a process performed across plural systems associated with a supply chain.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, order orchestrator module 116, interface module 120, commerce module 145, order management module 155, warehouse management module 165, transportation management module 175, supplier order management module 185, payment module 195, etc.). These systems may include any types of monitors and input devices (e.g., keyboard, mouse, voice recognition, etc.) to enter and/or view information.

It is to be understood that the software (e.g., order orchestrator module 116, interface module 120, commerce module 145, order management module 155, warehouse management module 165, transportation management module 175, supplier order management module 185, payment module 195, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., order orchestrator module 116, interface module 120, commerce module 145, order management module 155, warehouse management module 165, transportation management module 175, supplier order management module 185, payment module 195, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., order history, collected information, monitored information, order information, personnel information, completion times, rules, etc.). The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., order requests, status requests, confirmations, status, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

A report may include any information arranged in any fashion, and may be configurable based on rules or other criteria to provide desired information to a user (e.g., status history, orders, etc.).

The present invention embodiments are not limited to the specific tasks or algorithms described above, but may be utilized for monitoring and adapting various processes across plural systems performing at least a portion of the processes.

An order may include any quantity of item groups including any quantity of the same or different items, where each item group being fulfilled differently (e.g., different storage facility/provider, different shipping, etc.) may be monitored individually. The context for an order or item group may include any quantity of any features from any relevant information (e.g., collected, monitored, and/or order information, etc.). Any quantity of any features may be used to characterize an order or item group for determining monitoring intervals and/or actions. The jobs may be configured to be triggered to collect information at any desired intervals that accommodate monitoring intervals. The status may be any identifier indicating a state, progress, delay, failure, or other status of an order (e.g., numeric or alphanumeric identifier corresponding to a status, symbols corresponding to a status, text indicating a status, etc.). The order and item identifiers may include any quantity of any type of elements (e.g., numeric, alphanumeric, symbols, etc.).

Present invention embodiments may include any quantity of any type of local or remote sensing devices. The sensing devices (e.g., Internet of Things (IoT) devices, etc.) may be implemented by any conventional or other sensing devices (e.g., weather sensors, traffic sensors, GPS or other location sensors, equipment diagnostic or other sensors, etc.), may be disposed at any location (e.g., proximate and/or within an object), and may provide information for any desired conditions (e.g., weather and other environmental conditions, device operational status and failures, location of items and/or vehicles, etc.).

The various rules (e.g., process, monitoring, escalation, options, etc.) may be of any format and quantity, and may specify any quantity of any types of parameters (e.g., conditions, time intervals, etc.) and corresponding actions. The monitoring interval may specify any desired time interval or frequency (e.g., seconds, minutes, hours, days, weeks, months, years, etc.) for monitoring. The monitoring interval or frequency may indicate any manner of occurrence for the monitoring. For example, the monitoring interval or frequency may indicate a time interval, where monitoring may occur at least once within each recurrence of the time interval, or occur at or near initiation or expiration of each recurrence of the time interval. Further, the monitoring interval or frequency may indicate a quantity of occurrences of the monitoring within a specified time interval (e.g., a quantity of times per time interval, such as seconds, minutes, hours, etc.).

The clustering may employ any quantity of any type (e.g., unsupervised, supervised, etc.) of machine learning models (e.g., mathematical/statistical models, classifiers, feed-forward, recurrent or other neural networks, etc.). The clustering may utilize any conventional or other clustering technique (e.g., K-means, hierarchical, etc.) to generate any desired quantity of clusters associated with any desired characteristics (e.g., monitoring interval, etc.). The clusters may be formed in a feature space defined by any quantity of any relevant features.

The association (e.g., identification of orders in the order history) may employ any quantity of any type (e.g., unsupervised, supervised, etc.) of machine learning models (e.g., mathematical/statistical models, classifiers, feed-forward, recurrent or other neural networks, etc.). The association may utilize any conventional or other techniques (e.g., Apriori algorithm, etc.) to identify orders based on any quantity of any relevant features (e.g., order attributes, customer attributes, etc.).

The dynamic determination of the monitoring interval may be performed by any quantity of any type (e.g., unsupervised, supervised, etc.) of machine learning models (e.g., mathematical/statistical models, classifiers, feed-forward, recurrent or other neural networks, etc.). The machine learning models may map any quantity of any relevant features to monitoring intervals.

The monitor system may automatically control any systems in response to an alteration of the flow of the process (e.g., inventory systems, processing systems, transportation systems, etc.). For example, the monitor system may control inventory systems at warehouses to retrieve and/or pack items in response to a change of warehouses to fulfill an order, and/or control a sorting system at a transportation or shipping facility to adjust transportation of an item (e.g., to sort to a different bin for different shipping, etc.) to fulfill the order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of monitoring a process across a plurality of systems associated with a supply chain comprising:
   determining, via a processor, a context for an order including one or more features of the order, wherein at least one of the features of the context includes information from a networked sensing device, and wherein the order is associated with a monitoring interval for monitoring the order though an order fulfillment process performed by the plurality of systems associated with the supply chain;
   identifying, via the processor by one or more first machine learning models, a plurality of orders of an order history having features corresponding to the order to produce a training set;
   training, via the processor, a second machine learning model with the training set of the identified plurality of orders produced by the one or more first machine learning models to predict the monitoring interval for the order;
   predicting, via the processor by the second machine learning model, the monitoring interval for the order based on the context of the order;
   dynamically adjusting, via the processor, the monitoring interval for the order based on the predicted monitoring interval;
   monitoring, via the processor, the order through the order fulfillment process across the plurality of systems associated with the supply chain in accordance with the adjusted monitoring interval;
   modifying the training set, via the processor by the one or more first machine learning models, based on successful and failed monitoring with the adjusted monitoring interval; and
   training, via the processor, the second machine learning model with the modified training set produced by the one or more first machine learning models.

2. The method of claim 1, wherein at least two item groups of the order are fulfilled differently, and the method further comprises:
   determining, via the processor, the context for each of the at least two item groups;
   predicting, via the processor by the second machine learning model, the monitoring interval for each of the at least two item groups based on the context of that item group;
   dynamically adjusting, via the processor, an associated monitoring interval of each of the at least two item groups based on the predicted monitoring interval for that item group; and
   individually monitoring, via the processor, each of the at least two item groups through the order fulfillment process across the plurality of systems associated with the supply chain in accordance with the adjusted monitoring interval for that item group.

3. The method of claim 1, wherein the second machine learning model includes a supervised machine learning model, and the one or more first machine learning models include one or more from a group of:
   an unsupervised machine learning model to cluster orders of the order history based on the context of the order, wherein the clusters are each associated with a corresponding monitoring interval; and
   an unsupervised machine learning model to identify associated orders of the order history with features corresponding to the order, wherein the features corresponding to the order include customer attributes and item attributes.

4. The method of claim 3, further comprising:
   updating the supervised machine learning model by reinforcement learning based on results of the monitoring.

5. The method of claim 1, further comprising:
   detecting, via the processor, an exception during the monitoring;
   ranking, via the processor, options and corresponding systems of the plurality of systems to modify the order fulfillment process to satisfy prescribed requirements for the order; and
   modifying, via the processer, the order fulfillment process by transitioning to a corresponding system of a selected option to satisfy the prescribed requirements for the order.

6. The method of claim 5, further comprising:
   determining, via the processor, that the selected option fails to advance fulfillment of the order; and
   modifying, via the processer, the order fulfillment process based on a selected action to satisfy the prescribed requirements for the order.

7. The method of claim 6, wherein the selected action includes one of:
   an available action determined by the processor to satisfy the prescribed requirements of the order; and
   an action determined by a corresponding user in response to the processor failing to determine an available action.

8. The method of claim 5, further comprising:
   sending to one or more corresponding users, via the processor, an electronic notification pertaining to the detected exception.

9. A computer system for monitoring a process across a plurality of systems associated with a supply chain comprising:
   at least one processor configured to:
      determine a context for an order including one or more features of the order, wherein at least one of the features of the context includes information from a networked sensing device, and wherein the order is associated with a monitoring interval for monitoring the order though an order fulfillment process performed by the plurality of systems associated with the supply chain;
      identify, via one or more first machine learning models, a plurality of orders of an order history having features corresponding to the order to produce a training set;
      train a second machine learning model with the training set of the identified plurality of orders produced by the one or more first machine learning models to predict the monitoring interval for the order;
      predict, via the second machine learning model, the monitoring interval for the order based on the context of the order;
      dynamically adjust the monitoring interval for the order based on the predicted monitoring interval;
      monitor the order through the order fulfillment process across the plurality of systems associated with the supply chain in accordance with the adjusted monitoring interval;
      modify the training set, via the one or more first machine learning models, based on successful and failed monitoring with the adjusted monitoring interval; and train the second machine learning model with the modified training set produced by the one or more first machine learning models.

10. The computer system of claim 9, wherein at least two item groups of the order are fulfilled differently, and the at least one processor is further configured to:
determine the context for each of the at least two item groups;
predict, via the second machine learning model, the monitoring interval for each of the at least two item groups based on the context of that item group;
dynamically adjust an associated monitoring interval of each of the at least two item groups based on the predicted monitoring interval for that item group; and
individually monitor each of the at least two item groups through the order fulfillment process across the plurality of systems associated with the supply chain in accordance with the adjusted monitoring interval for that item group.

11. The computer system of claim 9, wherein the second machine learning model includes a supervised machine learning model, and the one or more first machine learning models include one or more from a group of:
an unsupervised machine learning model to cluster orders of the order history based on the context of the order, wherein the clusters are each associated with a corresponding monitoring interval; and
an unsupervised machine learning model to identify associated orders of the order history with features corresponding to the order, wherein the features corresponding to the order include customer attributes and item attributes.

12. The computer system of claim 11, wherein the at least one processor is further configured to:
update the supervised machine learning model by reinforcement learning based on results of the monitoring.

13. The computer system of claim 9, wherein the at least one processor is further configured to:
detect an exception during the monitoring;
rank options and corresponding systems of the plurality of systems to modify the order fulfillment process to satisfy prescribed requirements for the order; and
modify the order fulfillment process by transitioning to a corresponding system of a selected option to satisfy the prescribed requirements for the order.

14. The computer system of claim 13, wherein the at least one processor is further configured to:
determine that the selected option fails to advance fulfillment of the order; and
modify the order fulfillment process based on a selected action to satisfy the prescribed requirements for the order.

15. A computer program product for monitoring a process across a plurality of systems associated with a supply chain, the computer program product comprising one or more computer readable storage media having program instructions collectively stored on the one or more computer readable storage media, the program instructions executable by at least one processor to cause the at least one processor to:
determine a context for an order including one or more features of the order, wherein at least one of the features of the context includes information from a networked sensing device, and wherein the order is associated with a monitoring interval for monitoring the order though an order fulfillment process performed by the plurality of systems associated with the supply chain;

identify, via one or more first machine learning models, a plurality of orders of an order history having features corresponding to the order to produce a training set;
train a second machine learning model with the training set of the identified plurality of orders produced by the one or more first machine learning models to predict the monitoring interval for the order;
predict, via the second machine learning model, the monitoring interval for the order based on the context of the order;
dynamically adjust the monitoring interval for the order based on the predicted monitoring interval;
monitor the order through the order fulfillment process across the plurality of systems associated with the supply chain in accordance with the adjusted monitoring interval;
modify the training set, via the one or more first machine learning models, based on successful and failed monitoring with the adjusted monitoring interval; and
train the second machine learning model with the modified training set produced by the one or more first machine learning models.

16. The computer program product of claim 15, wherein at least two item groups of the order are fulfilled differently, and the program instructions executable by the at least one processor further cause the at least one processor to:
determine the context for each of the at least two item groups;
predict, via the second machine learning model, the monitoring interval for each of the at least two item groups based on the context of that item group;
dynamically adjust an associated monitoring interval of each of the at least two item groups based on the predicted monitoring interval for that item group; and
individually monitor each of the at least two item groups through the order fulfillment process across the plurality of systems associated with the supply chain in accordance with the adjusted monitoring interval for that item group.

17. The computer program product of claim 15, wherein the second machine learning model includes a supervised machine learning model, and the one or more first machine learning models include one or more from a group of:
an unsupervised machine learning model to cluster orders of the order history based on the context of the order, wherein the clusters are each associated with a corresponding monitoring interval; and
an unsupervised machine learning model to identify associated orders of the order history with features corresponding to the order, wherein the features corresponding to the order include customer attributes and item attributes.

18. The computer program product of claim 17, wherein the program instructions executable by the at least one processor further cause the at least one processor to:
update the supervised machine learning model by reinforcement learning based on results of the monitoring.

19. The computer program product of claim 15, wherein the program instructions executable by the at least one processor further cause the at least one processor to:
detect an exception during the monitoring;
rank options and corresponding systems of the plurality of systems to modify the order fulfillment process to satisfy prescribed requirements for the order; and
modify the order fulfillment process by transitioning to a corresponding system of a selected option to satisfy the prescribed requirements for the order.

20. The computer program product of claim 19, wherein the program instructions executable by the at least one processor further cause the at least one processor to:
- determine that the selected option fails to advance fulfillment of the order; and
- modify the order fulfillment process based on a selected action to satisfy the prescribed requirements for the order.

* * * * *